US012606955B2

(12) United States Patent
Jansson et al.

(10) Patent No.: US 12,606,955 B2
(45) Date of Patent: Apr. 21, 2026

(54) TREATMENT VESSEL HAVING REDUCED OUTLET END DIAMETER

(71) Applicant: VALMET AB, Sundsvall (SE)

(72) Inventors: Roger Jansson, Karlstad (SE); Jerk Söderman, Karlstad (SE); Jonas Saetheråsen, Hammarö (SE)

(73) Assignee: VALMET AB, Sundsvall (SE)

( * ) Notice: Subject to any disclaimer, the term of this patent is extended or adjusted under 35 U.S.C. 154(b) by 178 days.

(21) Appl. No.: 18/560,450

(22) PCT Filed: May 25, 2022

(86) PCT No.: PCT/SE2022/050511
§ 371 (c)(1),
(2) Date: Nov. 13, 2023

(87) PCT Pub. No.: WO2022/250602
PCT Pub. Date: Dec. 1, 2022

(65) Prior Publication Data

US 2024/0247440 A1 Jul. 25, 2024

(30) Foreign Application Priority Data

May 28, 2021 (SE) .................................... 2150679-5

(51) Int. Cl.
*D21C 7/08* (2006.01)
*B27K 3/02* (2006.01)
(Continued)

(52) U.S. Cl.
CPC .................. *D21C 7/08* (2013.01); *B27K 3/02* (2013.01); *D21C 1/00* (2013.01); *D21C 7/00* (2013.01)

(58) Field of Classification Search
CPC ... D21C 7/08; D21C 1/00; D21C 7/00; B27K 3/02
See application file for complete search history.

(56) References Cited

U.S. PATENT DOCUMENTS 2,400,194 A * 5/1946 Day ............................ B01J 8/12 422/216
2,555,052 A * 5/1951 Morse ....................... B01J 8/087 422/198
(Continued)

FOREIGN PATENT DOCUMENTS

CN 118202113 A * 6/2024 ............... D21D 5/28
WO WO-2016087717 A1 * 6/2016 ............... D21C 7/08
WO WO-2019/190375 A1 10/2019

OTHER PUBLICATIONS

International Search Report and Written Opinion of the International Searching Authority issued in the corresponding International Patent Application No. PCT/SE2022/050511, dated Sep. 23, 2022.

*Primary Examiner* — Anthony Calandra
(74) *Attorney, Agent, or Firm* — Foley & Lardner LLP

(57) ABSTRACT

A treatment vessel for treating lignocellulosic material comprises a main section having a first end and a second end, and an outlet section that is conical or frustoconical and tapers from a first end joined to the second end of the main section towards a second end having an outlet opening. A conical body is arranged within the treatment vessel, the vertex of the conical body pointing away from the main section. The conical body is positioned such that the base thereof is positioned within a perpendicular distance (d) from a transition plane (T) defined by the junction between the first end of the outlet section and the second end of the main section, wherein the perpendicular distance (d) is ¼ or less of the diameter (D) of the main section. A half angle (β) of the conical body is 0.5-20° less, preferably 5-15° less, such as 10° less, than a half angle (α) of the outlet section.

17 Claims, 1 Drawing Sheet

(51) Int. Cl.
*D21C 1/00* (2006.01)
*D21C 7/00* (2006.01)

(56) References Cited

U.S. PATENT DOCUMENTS

| | | | | | |
|---|---|---|---|---|---|
| 2,608,478 | A | * | 8/1952 | Pollock | C01B 3/28<br>48/197 R |
| 2,889,174 | A | * | 6/1959 | Schwing | B65G 53/36<br>406/146 |
| 3,081,009 | A | * | 3/1963 | Cooper | B03B 5/623<br>222/459 |
| 3,958,585 | A | * | 5/1976 | Humkey | C08F 6/005<br>134/61 |
| 4,207,292 | A | * | 6/1980 | Bischoff | B01D 53/508<br>422/216 |
| 4,432,836 | A | | 2/1984 | Richter | |
| 4,951,561 | A | * | 8/1990 | Moorman | B01D 11/0203<br>99/474 |
| 5,372,679 | A | * | 12/1994 | Costa | D21C 9/10<br>422/233 |
| 6,076,956 | A | * | 6/2000 | Scheucher | D21C 9/10<br>366/244 |

* cited by examiner

TREATMENT VESSEL HAVING REDUCED OUTLET END DIAMETER

TECHNICAL FIELD

The present invention relates to a treatment vessel having a reduced outlet end diameter.

BACKGROUND

Treatment vessels are commonly used within the field of producing pulp from a lignocellulosic material. Treatment vessels include pretreatment or impregnation vessels in which wood chips, representing a lignocellulosic material, are pretreated or impregnated with impregnation fluid to produce a chip slurry. Treatment vessels further include digesters in which the chip slurry is cooked in order to obtain pulp for later use in the making of pulp products such as paper. Additionally, treatment vessels include prehydrolysis vessels in which wood and non-wood materials such as wood chips and agricultural residues can be processed for producing fibers for pulp products such as paper.

Treatment vessels for treating lignocellulosic material generally need to be capable of withstanding pressure differences between the interior of the treatment vessel and the surrounding atmosphere. These pressure differences may be due to hydrostatic pressure, i.e., due to the weight of liquid and/or lignocellulosic material within the treatment vessel, due to injecting steam or other liquids or gases into the treatment vessel, and/or due to heating or cooking of the liquid and/or lignocellulosic material within the treatment vessel.

Treatment vessels for treating lignocellulosic material typically comprise an inlet for entry of lignocellulosic material into the treatment vessel and an outlet for discharging treated lignocellulosic material and liquids from the treatment vessel. The inlet and outlet may be combined in a combined inlet and outlet but are typically separate and placed at opposing ends of the treatment vessel. The outlet is provided at an outlet end of the treatment vessel which typically is dome shaped, to withstand pressure.

The outlet comprises an outlet opening through which the treated lignocellulosic material and any present fluid is discharged. As the treated lignocellulosic material and any present fluid is typically discharged into a discharge pipe, it is generally preferred to have an outlet opening, and hence an outlet end, that is significantly smaller in diameter than the inner diameter of the treatment vessel. This size reduction gives rise to several challenges when discharging the lignocellulosic material such as slow mass flow and blockages. Slow or stopped discharge of the lignocellulosic material from the treatment vessel limit the treatment capacity and treatment efficiency of the treatment vessel, and thus impact overall efficiency and cost of operating the treatment vessel and any preceding or following treatments step in the process of treating the lignocellulosic material.

Further, where the outlet end of the treatment vessel has a large diameter, e.g., by being dome-shaped, access to the outlet opening may be hindered or made inconvenient unless the treatment vessel is elevated significantly so as to allow access to the outlet opening. This however increases build height of the treatment vessel. Alternatively, a narrow treatment vessel may provide easier access to the outlet opening at the expense of significantly increased build height for the same internal volume as a wider treatment vessel.

There is accordingly a need for a treatment vessel for treating lignocellulosic material having a reduced outlet end diameter. There is a further need for a method of treating lignocellulosic material in treatment vessels having a reduced outlet end diameter.

SUMMARY

At least one of the abovementioned needs or at least one of the further needs which will become evident from the below description, are according to a first aspect of the present invention obtained by a treatment vessel for treating lignocellulosic material, the treatment vessel comprising: a main section having an interior volume for holding and treating lignocellulosic material, the main section having a first end and a second end, an outlet section having an interior volume in fluid communication with the interior volume of the main section, the outlet section being conical or frustoconical and tapering from a first end joined to the second end of the main section towards a second end of the outlet section, wherein an outlet opening for discharging lignocellulosic material from the treatment vessel is provided at the second end of the outlet section, and a conical body arranged within the treatment vessel, the vertex of the conical body pointing away from the main section, wherein the conical body is positioned such that the base thereof is positioned within a perpendicular distance from a transition plane defined by the junction between the first end of the outlet section and the second end of the main section, wherein the perpendicular distance is ¼ or less of the diameter of the main section.

The present invention is accordingly based on the recognition by the present inventors that using a conical or frustoconical outlet section together with the conical body positioned as described provides the treatment vessel with an outlet end that has a reduced diameter, i.e., due to the conically tapering outlet section, which makes it easier to access the outlet opening, yet is capable of maintaining the flow of lignocellulosic material obtained using larger diameter domed outlet ends. Surprisingly, this maintained flow of lignocellulosic material can be obtained without any significant increase of the height of the outlet section and/or the treatment vessel.

The treatment vessel is preferably selected from the group consisting of impregnation vessels for impregnating lignocellulosic material, digesters for cooking chip slurry to obtain pulp, and prehydrolysis vessels for treating agricultural residues at acid conditions. As the treatment vessel is generally placed vertically when used, the terms “first” and “second” used herein when relating to the treatment vessel or its constituent parts generally correspond to the terms “upper” and “lower”. The treatment vessel may be configured with a jacket for holding a heating or cooling medium in order to heat the treatment vessel. The treatment vessel is preferably made of metal such as steel.

Treating lignocellulosic material may comprise one or more of impregnating lignocellulosic material with an impregnation fluid in order to prepare the lignocellulosic material for later treatment, drying lignocellulosic material, heating lignocellulosic material, cooking lignocellulosic material, and/or hydrolyzing lignocellulosic material.

Typically, the treatment comprises the injection of one or more fluids into the treatment vessel. Accordingly, the treatment vessel therefore preferably comprises one or more inlets or nozzles for injecting fluid into the treatment vessel.

The term lignocellulosic material is used herein to mean materials containing lignin, cellulose, and hemicellulose. One example of such materials is wood, others include other agricultural or forestry wastes such as bagasse and wheat straw. When lignocellulosic material is treated in a treatment vessel by the injection of fluid, it will typically further comprise a quantity of the fluid. The term lignocellulosic material further encompasses lignocellulosic material in slurry form, such as mixtures or slurries containing lignin, cellulose, and hemicellulose and fluid.

Typically, the lignocellulosic material comprises wood chips, such as a wood chip slurry.

The treatment vessel is preferably suitable for treating the lignocellulosic material at a temperature of at least 70° C. Typically the lignocellulosic material is treated at a temperature of 70-165° C., such as 70-150° C., and the treatment vessel should preferably be suitable for treating the lignocellulosic material at these temperatures.

Additionally, or alternatively, the treatment vessel is preferably suitable for treating the lignocellulosic material with a fluid injected into the treatment vessel.

The main section is typically shaped as a cylinder. The main section may be defined as the section of the treatment vessel in which the circumference of the treatment vessel is constant along its center axis, i.e., as in a cylinder.

The main section has an interior volume for holding and treating the lignocellulosic material. The size of the interior volume depends on the dimensions of the main section. Typically, the treatment vessel, and thus the main section, may have a length (height) of 10 to 80 m, and a width (diameter) of 2-17 m.

The first end of the main section may generally be considered an upper end of the main section. The first end would correspond to the circumference at the upper end of a cylinder. Typically, the treatment vessel comprises an inlet section joined to the first end of the main section and defining a first end of the treatment vessel. The inlet section may be dome shaped, cupola shaped, conical, or frustoconical. The inlet section may further comprise an inlet opening for admitting lignocellulosic material into the treatment vessel.

The second end of the main section may generally be considered a lower end of the main section. The second end would correspond to the circumference at the lower end of a cylinder.

The outlet section is conical or frustoconical. The outlet section thus comprises at least one conical or frustoconical section. The outlet section may thus comprise one or more successive frustoconical section(s) eventually joined to a second or final frustoconical or conical section in which the outlet opening is provided, wherein the half angles of the sections may be identical or different for successive sections. It is however preferred that the outlet section has the shape of a cone or of a frustum of a cone.

Further, although preferred, the walls of the outlet section need not be straight. Accordingly, conical or frustoconical encompasses conical or frustoconical shapes which do not taper smoothly (i.e., with a constant angle between the wall surface and the center axis of the outlet section) from the base towards the vertex, rather the walls of the shapes may bulge inwards, or outwards, as they extend from the base towards the vertex.

The outlet section may be considered to define a second end, or an outlet end of the treatment vessel.

The outlet section may be formed integrally with the main section.

Alternatively, the outlet section is manufactured separately from the main section and thereafter attached to the main section.

The interior volume of the outlet section is in fluid communication with the interior volume of the main section. Accordingly, the interior volume of the outlet section, the main section, and, if present, the inlet section, together define the interior volume of the treatment vessel The term tapering means that the circumference of the outlet section decreases from the first end towards the second end. In other words, the first end has the same circumference as the main section, whereas the second end has a smaller circumference.

The first end of the outlet section may generally be considered an upper end of the outlet section. The first end of the outlet section is joined to the second end of the main section, thereby forming a junction, joint, or border between the sections.

The second end of the outlet section may generally be considered a lower end of the outlet section.

The outlet opening is preferably an opening or aperture at the second end of the outlet section. Preferably, the outlet opening is centered at the second end of the outlet section. Thus, the outlet opening is preferably provided at the vertex of the conical or frustoconical outlet section. Where the outlet section is conical, then the outlet opening may additionally or alternatively be arranged in the wall or surface of the cone.

The outlet opening preferably comprises a circular aperture. A conduit for receiving the discharged lignocellulosic material may be connected to the outlet opening, or the lignocellulosic material may be allowed to fall from the outlet opening into a receiving vessel arranged below the outlet opening. The outlet opening is suitable for discharging lignocellulosic material from the treatment vessel by having a diameter and/or area suitable for allowing the lignocellulosic material to pass through the outlet opening.

The conical body has a conical form with a base and a vertex and a center axis extending perpendicularly from the center of the base to the vertex.

The conical body is preferably circular symmetric. The conical body is arranged within the treatment vessel so that the vertex of the conical body points away from the main section. When the treatment vessel is positioned vertically for use, this corresponds to base of the conical body being positioned above the vertex.

The conical body is positioned such that the base thereof is positioned within a perpendicular distance from a transition plane defined by the junction between the first end of the outlet section and the second end of the main section.

The transition plane may be alternatively but equivalently defined as the plane formed by the circumference of the treatment vessel at the position where the circumference of the treatment vessel, which generally is constant along the main section, starts to decrease as the main section ends and the tapering outlet section begins.

The perpendicular distance is the shortest distance between the base and a point in the transition plane. As the treatment vessel is generally placed vertically when used, the perpendicular distance thus corresponds to the vertical distance between the base and the transition plane. Generally, the base is accordingly positioned a distance above or below the transition plane.

Where the base of the conical body is not parallel with the transition plane, then the perpendicular distance is measured from the center of the base.

The perpendicular distance is ¼ or less of the diameter of the main section. This corresponds to the base being positioned from ¼ of the diameter below the transition plane to ¼ of the diameter above the transition plane.

The vertex of the conical body preferably points parallel with, or along, the center axis of the treatment vessel. This corresponds to the base of the conical body being parallel with the transition plane. This is advantageous in that it provides a uniform distribution of lignocellulosic material passing the conical body. When the treatment vessel is arranged vertically, this configuration generally corresponds to the conical body being arranged with its base horizontal and parallel with the transition plane and its vertex pointing vertically downwards towards the outlet opening or the second end of the outlet section.

The center axis of the conical body is preferably aligned with the center axis of the treatment vessel. This is advantageous in that it provides a uniform cross-sectional area for the lignocellulosic material to flow through as the material enters and passes through the outlet section.

The perpendicular distance is preferably ⅛ of the diameter of the main section or less. More preferably, the perpendicular distance is preferably 1/16 or less, such as 1/32 or less, of the diameter of the main section.

This is advantageous in it has been found that positioning the base of the conical body close to the transition plane is beneficial for obtaining a good flow and discharge of lignocellulosic material.

The base of the conical body is preferably positioned within the interior volume of the outlet section. This corresponds to the perpendicular distance from the base of the conical body to the outlet opening being smaller than the perpendicular distance from the transition plane to the outlet opening. When the treatment vessel is arranged vertically, this configuration corresponds to the base of the conical body being arranged below the transition plane.

Practical examples have shown that this position of the base is efficient in maintaining the flow of lignocellulosic material towards the outlet opening.

Alternatively, the base of the conical body is positioned within the interior volume of the main section.

This corresponds to the perpendicular distance from the base of the conical body to the outlet opening being greater than the perpendicular distance from the transition plane to the outlet opening. When the treatment vessel is arranged vertically, this configuration corresponds to the base of the conical body being arranged above the transition plane. This position of the base increases the interior volume of the outlet section that is accessible to the lignocellulosic material.

The perpendicular distance is more preferably substantially 0.

Substantially 0 (zero) encompasses that the perpendicular distance is as small as can be achieved using conventional construction methods of constructing the treatment vessel and arranging the conical body within the treatment vessel. Substantially 0 thus covers perpendicular distances up to 10 mm, preferably up to 5 mm. Most preferably, the base of the conical body is positioned in the transition plane. Practical examples have shown that this position of the base is generally efficient in maintaining the flow of lignocellulosic material towards the outlet opening.

The half angle of the outlet section is preferably 25-75°, more preferably 45-65°. The half angle of the outlet section is most preferably 55-65°. The half angle is the angle between the side and the center axis at the vertex of the conical outlet section. For a frustoconical outlet section, the half angle is the angle between the side and the center axis at the vertex of a corresponding cone.

Practical examples have shown that these intervals of half angles are capable of providing an efficient flow of lignocellulosic material towards the outlet opening without significantly increasing the height of the outlet section and the treatment vessel.

The half angle of the conical body is 0.5-20° less or preferably 5-15° less, such as 10° less, than the half angle of the outlet section. The half angle of the conical body may further be 1-20°, 2-20°, 2-15°, 2-10°, such as 5-10° less than the half angle of the outlet section, or alternatively 0.5-15°, 1-15°, 1-10°, such as 1-5° less than the half angle of the outlet section.

This corresponds to the conical body being pointier than the outlet section. This configuration allows for positioning the vertex of the conical body closer to the outlet opening to prevent blockages or bridging below the conical body in the vicinity of the outlet opening.

Preferably the area of the base of the conical body is from 8 to 30%, such as 10-20% of the transverse cross-sectional area of the main section. The transverse cross-sectional area of the main section generally corresponds to the area of the transition plane.

As the treatment vessel is generally placed vertically when used, the transverse cross-sectional area of the main section corresponds to the horizontal cross-sectional area of the main section. Practical examples have shown that these intervals of areas are suitable for providing an efficient flow of lignocellulosic material towards the outlet opening.

Some of the lignocellulosic material passing through the treatment vessel will eventually encounter the base of the conical body to be deposited thereon. This material will eventually form a cone or column of lignocellulosic material. This cone will act as a deflector causing other parts of the lignocellulosic material to pass by the conical body.

Preferably, however, the conical body further comprises an additional body joined to the base of the conical body.

The additional body deflects the lignocellulosic material so that the material passes by the conical body without depositing on the base. This is advantageous as the deposited material is not discharged from the treatment vessel thus decreasing the capacity of the treatment vessel. The additional body may for example comprise a dome or cupola joined base-to-base with the conical body. Alternatively, the additional body may comprise a cylinder, or a stack of cylinders with stepwise decreasing diameters, joined base-to-base with the conical body. The diameter of the base of the additional body may be larger than or equal to the diameter of the base of the conical body, but is preferably smaller, such as ¼ to ¾ of the diameter of the base of the conical body.

Where the base of the conical body and the additional body have different areas and or diameters, then the additional body and the conical body are preferably joined base to base such that the smaller base is positioned within the circumference of the larger base.

Preferably, however, the additional body comprises an additional conical body joined base-to-base, preferably coaxially, to the conical body.

This provides an efficient means of deflecting the lignocellulosic material so that the material passes by the conical body.

The diameter of the base of the additional conical body may be larger than or equal to the diameter of the base of the conical body. In the former case an undercut is defined Preferably, however, the diameter of the base of the additional conical body is ¼ to ¾ of the diameter of the base of the conical body. Such a diameter, despite being less than the diameter of the base of the conical body, surprisingly provides an efficient diversion of the lignocellulosic material past the base of the conical body.

Typically, the half angle of the additional conical body is 90-20°, such as 89-20, preferably 30-50°.

These ranges of half angles are suitable for the additional conical body.

Preferably the area of the outlet opening is less than 20%, such as less than 10% of the area of the transition plane.

Generally, the outlet opening should have a diameter of at least 0.8 m and/or an area of at least 0.5 $m^2$.

The outlet section is preferably configured to withstand a pressure difference, between the interior volume of the outlet section and the atmosphere surrounding the treatment vessel, of at least 1 bar, preferably at least 4 bar, more preferably at least 15 bar.

The pressure in the interior volume of the outlet section is dependent on the hydrostatic pressure due to the height or level of lignocellulosic material above the outlet section, as well as any overpressure in the treatment vessel, e.g., due to injecting steam or other liquids or gases into the treatment vessel, and/or due to heating or cooking of the liquid and/or lignocellulosic material within the treatment vessel.

The treatment vessel is preferably selected from the group consisting of impregnation vessels for impregnating lignocellulosic material, digesters for cooking chip slurry to obtain pulp, and prehydrolysis vessels for treating agricultural residues at acid conditions. Prehydrolysis vessels are also suitable for treating wood and non-wood materials such as wood chips and agricultural residues at acid conditions. These types of treatment vessels will benefit from having a reduced outlet end diameter. More preferably the treatment vessel is an impregnation vessel or a digester. Additionally, the treatment vessel may be a steaming vessel for heating lignocellulosic material with steam.

At least one of the abovementioned needs or at least one of the further needs which will become evident from the below description, are according to a second aspect of the present invention obtained by a system for treating lignocellulosic material, the system comprising one or more treatment vessels according to the first aspect of the present invention. Such a system is advantageous in that provides easy access to the outlet openings of the treatment vessels while limiting build height and maintaining efficient flow of lignocellulosic material.

As an example the system may comprise a treatment vessel in the form of an impregnation vessel which is connected to and followed by a treatment vessel in the form of a digester. The treatment vessel in the form of the impregnation vessel may further be preceded by a treatment vessel in the form of a steaming vessel. Additionally, or alternatively, the impregnation vessel and the digester may be implemented in a single treatment vessel combining impregnation and digestion. Alternatively, the steaming vessel and impregnation vessel may be implemented in a single treatment vessel combining steaming and impregnation. In such systems the treatment vessels according to the first aspect of the present invention provide easier discharge and transfer of lignocellulosic material from one treatment vessel to the next.

As a further example, the system may comprise a treatment vessel in the form of a prehydrolysis vessel which is connected to and followed by a treatment vessel in the form of a digester. The treatment vessel in the form of the impregnation vessel may further be preceded by a treatment vessel in the form of a steaming vessel.

At least one of the abovementioned needs or at least one of the further needs which will become evident from the below description, are according to a third aspect of the present invention obtained by a method of treating lignocellulosic material, the method comprising using one or more treatment vessels according to the first aspect of the present invention, or the system according to the second aspect of the present invention.

This method provides a more efficient and simpler treatment of the lignocellulosic material. Preferably the method comprises treating the lignocellulosic material at a temperature of at least 70° C., as discussed above.

Preferably, the method further comprising discharging treated lignocellulosic material through the outlet opening.

Whereas the treatment vessel may be manufactured and installed in new plants for treating lignocellulosic material, it is further contemplated that also existing treatment vessels may be retrofitted with the outlet section and conical body so as to obtain the benefits of the present invention also for such existing treatment vessels. Accordingly, a fourth aspect of the present invention concerns a method of modifying a treatment vessel for treating lignocellulosic material, the treatment vessel comprising a main section having an interior volume for holding and treating lignocellulosic material, the main section having a first end and a second end, wherein the method comprises the step of:

providing the treatment vessel with an outlet section and a conical body defined according to the first aspect of the present invention.

Preferably the treatment vessel is suitable for treating the lignocellulosic material at a temperature of at least 70° C., as discussed above.

This method may involve removing an existing (dome-shaped) outlet section before providing the treatment vessel with the outlet section and the conical body defined according to the first aspect of the present invention. it is also possible to provide the outlet section and the conical body defined according to the first aspect of the present invention by opening up the treatment vessel, at the top or on the side, and introduce the outlet section and the conical body into the treatment vessel to be attached within the treatment vessel at the outlet end, thereby causing lignocellulosic material to be discharged via the introduced outlet section and the introduced conical body.

BRIEF DESCRIPTION OF THE DRAWINGS

A more complete understanding of the abovementioned and other features and advantages of the present invention will be apparent from the following detailed description of preferred embodiments in conjunction with the appended drawings, wherein.

All the figures are schematic, not necessarily to scale, and generally only show parts which are necessary in order to elucidate the respective embodiments, whereas other parts may be omitted or merely suggested.

Any reference number appearing in multiple drawings refers to the same object or feature throughout the drawings, unless otherwise indicated.

One or more superscript ' appended to a reference number indicates that the feature so reference is a variant of the feature assigned that reference number.

DETAILED DESCRIPTION

Figure 1:
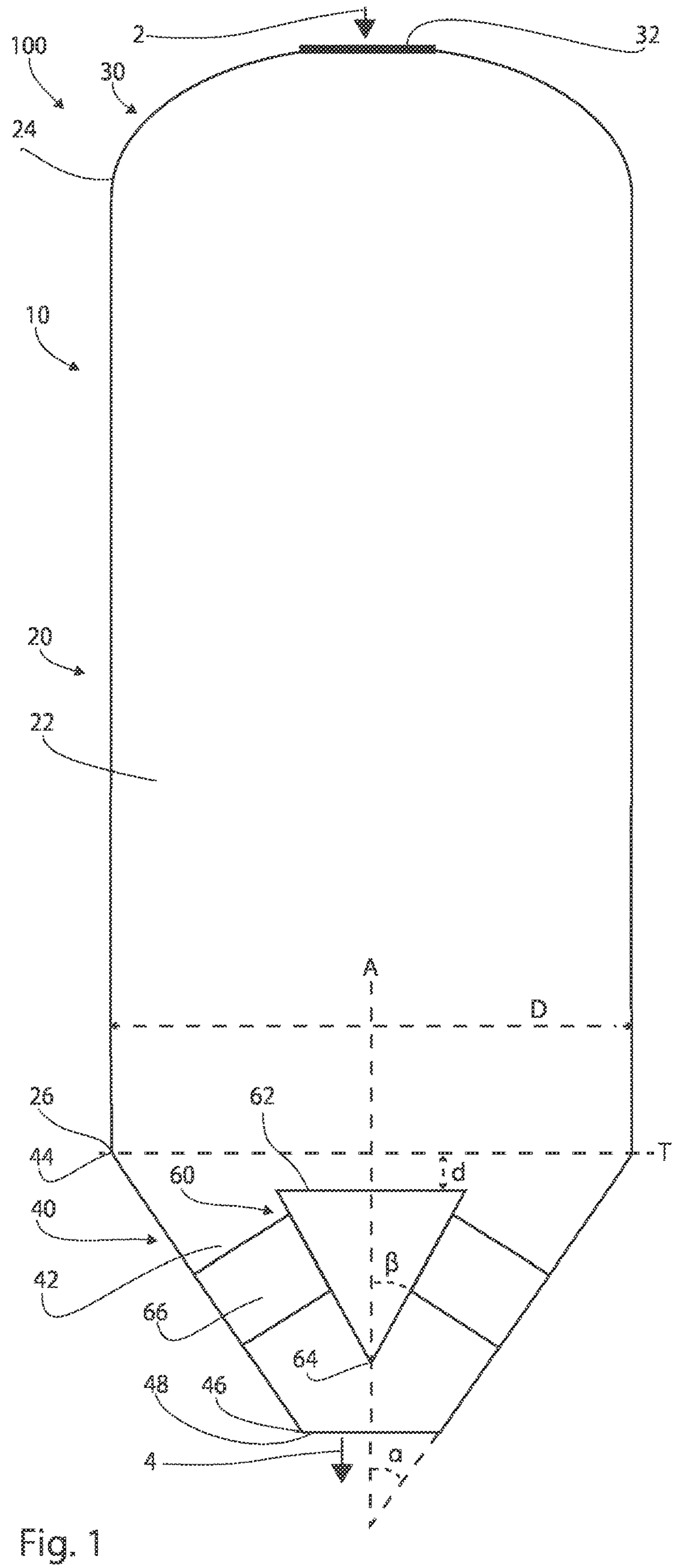
FIG. 1 shows an embodiment of a treatment vessel and a system according to the first and second aspects of the present invention.

FIG. 1 shows an embodiment of a treatment vessel 10 and a system 100 according to the first and second aspects of the present invention. The treatment vessel 10 comprises a main section 20 having an interior volume 22 for holding and treating lignocellulosic material 2, the main section having a first (upper) end 24 and a second (lower) end 26. As shown here, the main section 20 is preferably circular cylindrical having a center axis A. A dome-shaped inlet section 30 is provided at the first end 24 to close the upper end of the treatment vessel 10 and comprises an inlet opening 32 for allowing lignocellulosic material 2 to enter the treatment vessel 10. An outlet section 40 having an interior volume 42 in fluid communication with the interior volume 22 of the main section is provided below the main section. The outlet section 40 is here shown to have a frustoconical form and tapers from a first (upper) end 44, which is joined to the second end 26 of the main section 20, towards a second (lower) end 46 of the outlet section 40. An outlet opening 48 for discharging 4 treated lignocellulosic material from the treatment vessel 10 is provided at the second end 46 of the outlet section 40.

In use, lignocellulosic material, such as wood chips, enters the treatment vessel 10 through the inlet opening 32 to be held and treated within the treatment vessel 10. Depending on the type of treatment vessel, e.g., impregnation vessel, digester, or prehydrolysis vessel, the lignocellulosic material is heated, dried, and/or agitated, and fluid, such as impregnation fluid, base, or acid, is added into the treatment vessel 10 as part of the treatment of the lignocellulosic material 2. The treatment vessel 10 may be operated in a batch process, or in a continuous process. In a continuous process, the lignocellulosic material 2 passes through the treatment vessel while being treated.

The treatment vessel 10 further comprises a conical body 60 arranged within the treatment vessel 10, the conical body 60 having a base 62 and a vertex 64, the latter pointing away from the main section 20. The conical body 60 is arranged and supported by supports, one being designated the reference number 66, extending between the conical body 60 and the inner wall of the outlet section 40.

The conical body 60 is positioned such that the base 62 thereof is positioned within a perpendicular distance d from a transition plane T defined by the junction between the first end 44 of the outlet section 40 and the second end 26 of the main section 20. The distance d is ¼ or less of the diameter D of the main section 20.

Thus, where conventionally a dome-shaped outlet section would be used, which dome-shape would restrict access to the outlet opening 48 unless the treatment vessel 10 is elevated, the treatment vessel 10, due to the conical or frustoconical outlet section 40 and the conical body 60 provides a reduced outlet end diameter with maintained flow of lignocellulosic material 4.

Preferably, as shown, the vertex 64 points or along the center axis A of the treatment vessel 10, and the center axis of the conical body is aligned with the center axis A of the treatment vessel 10. For clarity, the base 62 of the conical body 60 is shown positioned within the interior volume 42 of the outlet section 40 so that the perpendicular distance d is discernible. preferably, however, the perpendicular distance d is substantially 0 so that the base 62 of the conical body 60 is positioned parallel with and within the transition plane T.

The half angle $\alpha$ of the outlet section 40 and the half angle $\beta$ of the conical body 60 is also indicated in FIG. 1. The latter is preferably less than the former as is also shown in FIG. 1.

The conical body 60 may further comprise an additional body joined to the base 62 of the conical body. This additional body acts to divert lignocellulosic material to flow past the conical body 60 without depositing on the base 62 thereof. The additionally body may have different forms.

Figure 2A:
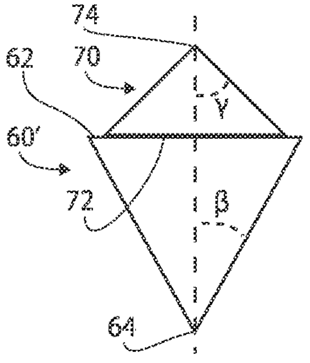
FIG. 2A-2C show various embodiments of the conical body comprised by the treatment vessel.

FIG. 2A accordingly shows a first alternative embodiment of the conical body 60 shown in FIG. 1. This conical body, referenced as 60', additionally comprises an additional conical body 70 having a base 72 joined base-to-base with the base 62. The additional conical body 70 further has a vertex 74 which, when the conical body 60' is positioned in the treatment vessel, points away from the outlet opening. The half angle $\gamma$ of the additional conical body 70 preferably larger than the half angle $\beta$.

Figure 2B:
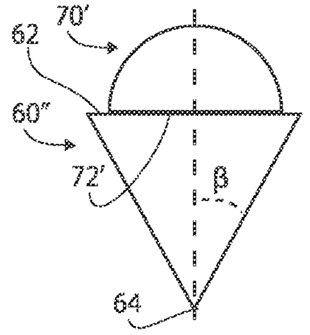

FIG. 2B shows a second alternative embodiment of the conical body 60 shown in FIG. 1. This conical body, referenced as 60", additionally comprises an additional body in the form of a dome 70' having a base 72' and joined base-to-base with the base 62.

Figure 2C:
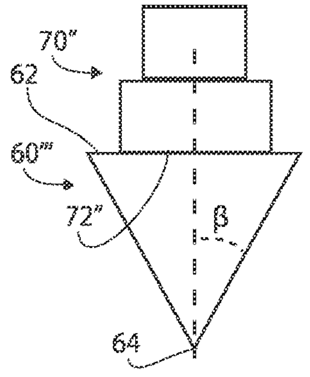

FIG. 2*c* shows a third alternative embodiment of the conical body 60 shown in FIG. 1. This conical body, referenced as 60'", additionally comprises an additional body in the form of a set 70" of stacked cylinders, whereby the base 72" of the cylinder with the largest diameter is joined to the base 62.

As shown in FIGS. 2A, 2B and 2C, the diameter of the base 72, 72' and 72" of the additional body is preferably smaller than the diameter of the base 62.

Feasible Modifications

The invention is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims. Thus, the equipment may be modified in all kinds of ways within the scope of the appended claims.

It shall also be pointed out that all information about/concerning terms such as above, under, upper, lower, etc., shall be interpreted/read having the equipment oriented according to the figures, having the drawings oriented such that the references can be properly read. Thus, such terms only indicate mutual relations in the shown embodiments, which relations may be changed if the inventive equipment is provided with another structure/design.

It shall also be pointed out that even thus it is not explicitly stated that features from a specific embodiment may be combined with features from another embodiment, the combination shall be considered obvious, if the combination is possible.

Throughout this specification and the claims which follows, unless the context requires otherwise, the word "comprise", and variations such as "comprises" or "comprising", will be understood to imply the inclusion of a stated integer or steps or group of integers or steps but not the exclusion of any other integer or step or group of integers or steps.

The invention claimed is:

1. A treatment vessel for treating lignocellulosic material, the treatment vessel comprising:

a main section having an interior volume for holding and treating lignocellulosic material, the main section having a first end and a second end;

an outlet section having an interior volume in fluid communication with the interior volume of the main section, the outlet section being conical or frustoconical and tapering from a first end joined to the second end of the main section towards a second end of the outlet section, wherein an outlet opening for discharging lignocellulosic material from the treatment vessel is provided at the second end of the outlet section; and a conical body arranged within the treatment vessel, the conical body having a flat base that is exposed to the interior volume of the outlet section, and a vertex pointing away from the main section, wherein the conical body is positioned such that the base thereof is positioned within a perpendicular distance from a transition plane defined by the junction between the first end of the outlet section and the second end of the main section, wherein the perpendicular distance is ¼ or less of the diameter of the main section, characterized in that a half angle of the conical body is 0.5-20° less than a half angle of the outlet section.

2. The treatment vessel according to claim 1, wherein the vertex of the conical body points parallel with, or along, a center axis of the treatment vessel.

3. The treatment vessel according to claim 1 wherein a center axis of the conical body is aligned with a center axis of the treatment vessel.

4. The treatment vessel according to claim 1, wherein the perpendicular distance is ⅛ of the diameter of the main section or less.

5. The treatment vessel according to claim 1, wherein the perpendicular distance is substantially 0.

6. The treatment vessel according to claim 1, wherein the half angle of the outlet section is 25-75°.

7. The treatment vessel according to claim 1, wherein an area of the base of the conical body is from 8 to 30% of a transverse cross-sectional area of the main section.

8. The treatment vessel according to claim 1, wherein an area of the outlet opening is less than 20% of an area of the transition plane.

9. The treatment vessel according to claim 1, wherein the outlet section is configured to withstand a pressure difference, between the interior volume of the outlet section and the atmosphere surrounding the treatment vessel, of at least 1 bar.

10. The treatment vessel according to claim 1, wherein the treatment vessel is an impregnation vessel, a digester, or a prehydrolysis vessel.

11. A system for treating lignocellulosic material, the system comprising:

one or more treatment vessels according to claim 1; and a conduit connected to the outlet opening of the one or more treatment vessels for receiving discharged lignocellulosic material.

12. A method comprising:

treating lignocellulosic material using one or more treatment vessels according to claim 1.

13. The method according to claim 12, further comprising discharging treated lignocellulosic material through the outlet opening of the one or more treatment vessels.

14. A treatment vessel for treating lignocellulosic material, the treatment vessel comprising:

a main section having an interior volume for holding and treating lignocellulosic material, the main section having a first end and a second end;

an outlet section having an interior volume in fluid communication with the interior volume of the main section, the outlet section being conical or frustoconical and tapering from a first end joined to the second end of the main section towards a second end of the outlet section, wherein an outlet opening for discharging lignocellulosic material from the treatment vessel is provided at the second end of the outlet section;

a conical body arranged within the treatment vessel, a vertex of the conical body pointing away from the main section; and an additional conical body joined base-to-base to the conical body;

wherein the conical body is positioned such that the base thereof is positioned within a perpendicular distance from a transition plane defined by the junction between the first end of the outlet section and the second end of the main section, wherein the perpendicular distance is ¼ or less of the diameter of the main section, characterized in that a half angle of the conical body is 0.5-20° less than a half angle of the outlet section, and wherein a diameter of the base of the additional conical body is ¼ to ¾ of a diameter of the base of the conical body.

15. The treatment vessel according to claim 14, wherein a half angle of the additional conical body is 20-90°.

16. A treatment vessel for treating lignocellulosic material, the treatment vessel comprising:

a main section having an interior volume for holding and treating lignocellulosic material, the main section having a first end and a second end;

an outlet section having an interior volume in fluid communication with the interior volume of the main section, the outlet section being conical or frustoconical and tapering from a first end joined to the second end of the main section towards a second end of the outlet section, wherein an outlet opening for discharging lignocellulosic material from the treatment vessel is provided at the second end of the outlet section;

a conical body arranged within the treatment vessel, a vertex of the conical body pointing away from the main section; and a dome-shaped or cupola-shaped body joined base-to-base to the conical body;

wherein the conical body is positioned such that the base thereof is positioned within a perpendicular distance from a transition plane defined by the junction between the first end of the outlet section and the second end of the main section, wherein the perpendicular distance is ¼ or less of the diameter of the main section, characterized in that a half angle of the conical body is 0.5-20° less than a half angle of the outlet section, and wherein a diameter of the base of the dome-shaped or cupola-shaped body is ¼ to ¾ of a diameter of the base of the conical body.

17. A treatment vessel for treating lignocellulosic material, the treatment vessel comprising:

a main section having an interior volume for holding and treating lignocellulosic material, the main section having a first end and a second end;

an outlet section having an interior volume in fluid communication with the interior volume of the main section, the outlet section being conical or frustoconical and tapering from a first end joined to the second end of the main section towards a second end of the outlet section, wherein an outlet opening for discharging lignocellulosic material from the treatment vessel is provided at the second end of the outlet section;

a conical body arranged within the treatment vessel, a vertex of the conical body pointing away from the main section; and at least one cylindrical body joined base-to-base to the conical body;

wherein the conical body is positioned such that the base thereof is positioned within a perpendicular distance from a transition plane defined by the junction between the first end of the outlet section and the second end of the main section, wherein the perpendicular distance is ¼ or less of the diameter of the main section, characterized in that a half angle of the conical body is 0.5-20° less than a half angle of the outlet section, and wherein a diameter of the base of the at least one cylindrical body is ¼ to ¾ of a diameter of the base of the conical body.

* * * * *